(12) United States Patent
Zhan et al.

(10) Patent No.: US 11,202,202 B2
(45) Date of Patent: Dec. 14, 2021

(54) FINGERPRINT IDENTIFICATION AUTHORITY CONTROL-BASED INTERNET OF THINGS CONTROL SWITCH AND METHOD

(71) Applicant: Espressif Systems (Shanghai) Co., Ltd., Shanghai (CN)

(72) Inventors: Rui Zhan, Shanghai (CN); Liwei Jiang, Shanghai (CN); Shi Chen, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 260 days.

(21) Appl. No.: 16/469,409

(22) PCT Filed: Mar. 9, 2018

(86) PCT No.: PCT/CN2018/078573
§ 371 (c)(1),
(2) Date: Jun. 13, 2019

(87) PCT Pub. No.: WO2018/196493
PCT Pub. Date: Nov. 1, 2018

(65) Prior Publication Data
US 2020/0112855 A1    Apr. 9, 2020

(30) Foreign Application Priority Data

Apr. 24, 2017  (CN) .......................... 201710271161.8

(51) Int. Cl.
*H04L 29/06*    (2006.01)
*H04W 12/06*    (2021.01)
(Continued)

(52) U.S. Cl.
CPC ........ *H04W 12/06* (2013.01); *G06K 9/00067* (2013.01); *G06K 9/00087* (2013.01);
(Continued)

(58) Field of Classification Search
None
See application file for complete search history.

(56) References Cited

U.S. PATENT DOCUMENTS 6,907,134 B1    6/2005  Yamada et al.
9,888,337 B1 *  2/2018  Zalewski ............. H04W 76/14
(Continued)

FOREIGN PATENT DOCUMENTS

CN    102572095    7/2012
CN    104883724    9/2015
(Continued)

OTHER PUBLICATIONS

Sharaf-Dabbagh, Yaman; Saad, Walid. On the authentication of devices in the Internet of things. 2016 IEEE 17th International Symposium on A World of Wireless, Mobile and Multimedia Networks (WoWMoM). https://ieeexplore.IEEE.org/stamp/stamp.jsp?tp=&arnumber=7523532 (Year: 2016).*
(Continued)

*Primary Examiner* — Jeremiah L Avery
(74) *Attorney, Agent, or Firm* — Reinhart Boerner Van Deuren P.C.

(57) ABSTRACT

The present invention relates to an IoT control switch and method based on fingerprint identification permission control, comprising performing user identity and permission verification through fingerprint identification, implementing a MAC layer connectionless communication mechanism between a wire-free fingerprint Wi-Fi IoT switch and a standard Wi-Fi IoT device, and carrying control information for controlling the Wi-Fi IoT device by a privately defined control information element in a unicast packet or broadcast packet without requiring a MAC layer connection; the invention requires little modification, is cost effective to implement, and the data type, manner of acknowledgement, manner of encryption, and different fingerprint security
(Continued)

control modes may be freely combined with each other, thereby providing wide applicability. The wire-free fingerprint Wi-Fi IoT switch may complete the translation of control information to the standard Wi-Fi IoT device by sending least number of packets, so as to realize low power consumption control. The wire-free fingerprint Wi-Fi IoT switch may also connect to an internet server via a Wi-Fi access point to perform update and upgrade of firmware, fingerprint feature information list, etc.

15 Claims, 1 Drawing Sheet

(51) Int. Cl.
*G06K 9/00* (2006.01)
*H04L 5/00* (2006.01)
*H04L 29/12* (2006.01)
*H04L 29/08* (2006.01)
*H04W 12/08* (2021.01)
*H04W 12/03* (2021.01)
*G16Y 30/10* (2020.01)
*H04W 84/12* (2009.01)

(52) U.S. Cl.
CPC ............ *H04L 5/0055* (2013.01); *H04L 61/20* (2013.01); *H04L 63/0861* (2013.01); *H04L 63/101* (2013.01); *H04L 67/12* (2013.01); *H04W 12/03* (2021.01); *H04W 12/08* (2013.01); *G16Y 30/10* (2020.01); *H04L 61/6022* (2013.01); *H04W 84/12* (2013.01)

(56) References Cited

U.S. PATENT DOCUMENTS

2015/0334554 A1* 11/2015 Song .................... H04W 8/205
                                                          455/558
2017/0109840 A1*  4/2017 Lu .......................... G06Q 50/01
2017/0331670 A1* 11/2017 Parkvall .............. H04L 41/0233

FOREIGN PATENT DOCUMENTS

CN      105184135      12/2015
CN      106878025       6/2017

OTHER PUBLICATIONS

Thanigaivelan, Nanda Kumar et al. Distributed Internal Anomaly Detection System for Internet-of-Things. 2016 13th IEEE Annual Consumer Communications & Networking Conference (CCNC). https://ieeexplore.ieee.org/stamp/stamp.jsp?tp=&arnumber=7444797 (Year: 2016).*

Xu, Qiang et al. Device Fingerprinting in Wireless Networks: Challenges and Opportunities. IEEE Communications Surveys and Tutorials, vol. 18, Issue 1. https://ieeexplore.ieee.org/stamp/stamp.jsp?tp=&arnumber=7239531 (Year: 2016).*

\* cited by examiner

FINGERPRINT IDENTIFICATION AUTHORITY CONTROL-BASED INTERNET OF THINGS CONTROL SWITCH AND METHOD

TECHNICAL FIELD

The present invention relates to the field of Wi-Fi IoT, particularly to an IoT control switch and method based on fingerprint identification permission control operating in connectionless low power consumption communication mode in standard Wi-Fi MAC layer.

BACKGROUND ART

With the advent of the age of IoT (Internet of Things), a large number of domestic or commercial IoT devices are emerging in the market. IoT devices are usually interconnected through a certain wireless connection technology. The 802.11 Wi-Fi wireless communication standard is one of the wireless access technology standards that are most widely used. In the field of IoT, the Wi-Fi IoT access mode is even one of the most widely used, most cost effective, and the most extensible IoT access modes. Usually, a Wi-Fi IoT device accesses network directly through a Wi-Fi access point (Wi-Fi Access Point, also referred to as a Wi-Fi hotspot or wireless router).

Currently, the vast majority of commercially available IoT devices are controlled through applications on mobile terminals such as mobile phones and pads, which is inconvenient at most times. For example, popular Wi-Fi IoT illumination devices in the market usually require an application interface on a mobile terminal to control the switching as well as adjustment of the luminance and hue of an illumination device, which are often equipped with conventional mechanical switches for simple switching and luminance control. Such a switch control mode suffers from both the complexity and inconvenience of existing application interfaces, and the inflexibility of positioning of traditional mechanical switch controls as well as the redundancy and difficulty of wiring.

In most circumstances, a flexible positioning, wire-free, on site control mode for illumination devices or other commonly seen domestic devices will be more attractive to users.

Based on the above described requirements for wireless illumination control, there are already some wire-free, remote controlled illumination switch devices available in the market. These wire-free, remote controlled illumination switch devices operate in a non-standardized manner in a non-standardized frequency band (e.g., 1 GHz, 315 MHz), using private communication mode to perform simple switching control to illumination devices, without support to mobile phone application control. Moreover, these devices operate in non-public frequency bands and may easily interfere with signals from other systems, thereby influencing the users experience.

Meanwhile, as requirements for permission distinction of IoT device control in certain special application scenarios are emerging, in some application scenarios, the requirements for restricting identity permission for the person in control are quite complicated, a way of identity identification is needed to distinguish the control permissions of different users.

Fingerprint identification mode is a common way of identity identification, which is a simple and reliable measure for permission control. As compared with other biometric identification technologies, such as sound wave identification, iris identification, face identification, retina identification, fingerprint identification mode has the advantages of being a mature and reliable technology with easier implementation algorithms, and low cost of application.

Further, the control of conventional Wi-Fi IoT devices is usually based on Wi-Fi links. However, in some application scenarios where Wi-Fi IoT switch control information is generated in very low frequencies, if a control communication mode based on links is used, almost every time when a Wi-Fi IoT device is to be controlled, a Wi-Fi IoT switch has to re-establish a Wi-Fi link to the device, which may spend most energies on control frames. In application scenarios where multiple devices are to be controlled simultaneously, the control process will become more complicated and energy consuming.

SUMMARY OF THE INVENTION

An object of the present invention is to provide an IoT control switch and method based on fingerprint identification permission control, wherein a fingerprint module is utilized to perform user identity and permission verification, a MAC layer connectionless communication mechanism is implemented between a wire-free fingerprint Wi-Fi IoT switch and standard Wi-Fi IoT devices, and low power consumption switching control is realized with IoT device specific permissions.

A technical solution of the present invention is to provide an IoT control switch based on fingerprint identification permission control: a Wi-Fi IoT switch comprises:

a fingerprint acquisition module, which acquires fingerprint information;

a fingerprint identification and fingerprint feature extraction module, which is communicatively connected with the fingerprint acquisition module to obtain the acquired fingerprint information, so as to perform identification and extraction of fingerprint feature;

a fingerprint feature and control permission list module, which stores a fingerprint feature and control permission list matching with identifiable fingerprint information, and is communicatively connected with the fingerprint identification and fingerprint feature extraction module to obtain the extracted fingerprint feature, to identify and determine a control permission and a fingerprint control mode corresponding thereto;

a fingerprint feature compression module, which is communicatively connected with the fingerprint identification and fingerprint feature extraction module and/or the fingerprint feature and control permission list module to obtain and compress the extracted fingerprint feature, so as to produce compressed fingerprint feature information;

a control command retrieval and generation module, which is communicatively connected with the fingerprint feature and control permission list module to obtain the determined control permission and fingerprint control mode, and generates corresponding control command field; or, the control command retrieval and generation module is communicatively connected with the fingerprint feature compression module and the fingerprint feature and control permission list module to obtain the compressed fingerprint feature information and the determined control permission and the fingerprint control mode, and generate a corresponding control command field;

a Wi-Fi module, which is communicatively connected with the control command retrieval and generation module to obtain the generated control command field, carry the control command field by a privately defined control information element in a unicast packet or broadcast packet without requiring a MAC layer connection, and send the unicast packet or broadcast packet to one or more Wi-Fi IoT devices, so as to control a Wi-Fi IoT device or device group matching with the control permission.

Preferably, the Wi-Fi IoT switch further comprises a fingerprint information and firmware upgrade control module, which is communicatively connected with an IoT cloud server through a Wi-Fi module connected to a Wi-Fi access point in an STA mode, performs firmware upgrade to the Wi-Fi IoT switch, and/or obtains the identifiable fingerprint information and the fingerprint feature and control permission list matching therewith recorded by the IoT cloud server, and sends the obtained information and list to the fingerprint feature and control permission list module for information update.

Preferably, the broadcast packet contains pairing information in the privately defined control information element;

the unicast packet distinguishes paired devices through addresses in packet headers, or contains pairing information in the privately defined control information element;

the pairing information, cooperatively provided by the Wi-Fi IoT device and an external smart terminal, comprises pairing information between fingerprint feature of a user or user group acquired by the smart terminal and a Wi-Fi IoT device or device group controllable within the permission of the user or user group;

the pairing information further comprises one or more of:

information for setting a control security level and a corresponding fingerprint control mode for the controllable Wi-Fi IoT device or device group by the smart terminal;

information for pairing the Wi-Fi IoT switch a MAC address and the controllable Wi-Fi IoT device or device group;

a MAC address of the controllable Wi-Fi IoT device or device group;

information for setting an encryption key for a control command corresponding to the control command field.

Preferably, the Wi-Fi IoT switch conforms to one or more of S1, S2, and S3:

S1) the unicast packet or broadcast packet is a Beacon packet, a ProbResp packet, a ProbReq packet, or an Action packet;

S2) the control command corresponding to the control command field is provided with a key for application layer encryption, or provided a key for MAC layer encryption, or no encryption;

S3) the fingerprint control mode, comprising:

a first fingerprint control mode, wherein the Wi-Fi IoT switch, based on a result of local acquisition and identification of a single fingerprint of a single person, sends a unicast packet or broadcast packet carrying the control command field to the corresponding Wi-Fi IoT device or device group;

or, a second fingerprint control mode, wherein the Wi-Fi IoT switch, based on a result of local acquisition and identification of multiple fingerprints of a single person or multiple fingerprints of multiple persons, sends a unicast packet or broadcast packet carrying the control command field to the corresponding Wi-Fi IoT device or device group; the multiple fingerprints of a single person or multiple fingerprints of multiple persons are acquired in a specified order, or acquired without order;

or, a third fingerprint control mode, wherein the Wi-Fi IoT switch, based on a result of local acquisition and identification of multiple fingerprints of a single person or multiple fingerprints of multiple persons, sends a unicast packet or broadcast packet carrying the control command field to corresponding Wi-Fi IoT device or device group; at least one Wi-Fi IoT device that receives the unicast packet or broadcast packet, sends the compressed fingerprint feature information contained in the control command field to the IoT cloud server through a Wi-Fi access point; the IoT cloud server performs a secondary fingerprint identification verification on the compressed fingerprint feature information after decompression, and feeds back the result of secondary verification to all Wi-Fi IoT devices that have received the unicast packet or broadcast packet; the Wi-Fi IoT devices that have received the unicast packet or broadcast packet, according to the result of secondary verification, determine whether to execute the control command corresponding to the control command field.

Another technical solution of the present invention is to provide an IoT control method based on fingerprint identification permission control, wherein:

performing, through a Wi-Fi IoT switch, the following fingerprint control operations of:

acquiring fingerprint information, and extracting corresponding fingerprint feature;

based on a stored fingerprint feature and control permission list matching with identifiable fingerprint information, performing identification of the extracted fingerprint feature and determining a control permission and a fingerprint control mode corresponding thereto;

generating a control command field corresponding to the control command, the control permission and the fingerprint control mode; or, generating a control command field corresponding to compressed fingerprint feature information, the control command, the control permission and the fingerprint control mode; the compressed fingerprint feature information is produced by compressing the extracted fingerprint feature compress;

using a configured Wi-Fi module to carry the control command field by a privately defined control information element in a unicast packet or broadcast packet without requiring a MAC layer connection, and send the unicast packet or broadcast packet to one or more Wi-Fi IoT devices, and control a Wi-Fi IoT device or device group matching with the control permission.

Preferably, according to the determined first fingerprint control mode, the Wi-Fi IoT switch, based on a result of local acquisition and identification of a single fingerprint of a single person, sends a unicast packet or broadcast packet carrying the control command field to a corresponding Wi-Fi IoT device or device group;

or, according to the determined second fingerprint control mode, the Wi-Fi IoT switch, based on a result of local acquisition and identification of multiple fingerprints of a single person or multiple fingerprints of multiple persons, sends a unicast packet or broadcast packet carrying the control command field to the corresponding Wi-Fi IoT device or device group; the multiple fingerprints of a single person or multiple fingerprints of multiple persons are acquired in a specified order, or acquired without order;

or, according to the determined third fingerprint control mode, the Wi-Fi IoT switch, based on a result of local acquisition and identification of multiple fingerprints of a single person or multiple fingerprints of multiple persons, sends a unicast packet or broadcast packet carrying the control command field to corresponding Wi-Fi IoT device or device group;

at least one Wi-Fi IoT device that receives the unicast packet or broadcast packet, sends the compressed fingerprint feature information contained in the control command field to the IoT cloud server through a Wi-Fi access point;

the IoT cloud server performs a secondary fingerprint identification verification on the compressed fingerprint feature information after decompression, and feeds back the result of secondary verification to all Wi-Fi IoT devices that have received the unicast packet or broadcast packet;

the Wi-Fi IoT devices that have received the unicast packet or broadcast packet, according to the result of secondary verification, determine whether to execute the control command corresponding to the control command field.

Preferably, before the Wi-Fi IoT switch performs the fingerprint control operation, the method further comprises the following system configuration operations performed by a smart terminal:

the smart terminal pairing the acquired fingerprint feature of the user or user group and the Wi-Fi IoT device or device group controllable within the permission of the user or user group;

setting a control security level and a corresponding fingerprint control mode to be implemented for the controllable Wi-Fi IoT device or device group;

setting a MAC address for the controllable Wi-Fi IoT device or device group, and an encryption key for the control command;

pairing the MAC address of the Wi-Fi IoT switch with the controllable Wi-Fi IoT device or device group;

uploading an information list containing the fingerprint feature, the MAC address group, the control command type, the encryption key information, and the fingerprint control mode to the IoT cloud server;

connecting the Wi-Fi module of the Wi-Fi IoT switch to a nearby Wi-Fi access point through a standard Wi-Fi STA mode, obtaining the fingerprint feature and control permission list from the IoT cloud server, and storing the obtained fingerprint feature and control permission list to the fingerprint feature and control permission list module for information update.

Preferably, the Wi-Fi IoT switch conforms to S1 and/or S2:

S1) the unicast packet or broadcast packet is a Beacon packet, a ProbResp packet, a ProbReq packet, or an Action packet;

S2) the control command corresponding to the control command field is provided with a key for application layer encryption, or provided a key for MAC layer encryption, or no encryption.

Preferably, the Wi-Fi IoT device carries an acknowledgement information element defined in the application layer or MAC layer in a unicast packet or broadcast packet fed back to the Wi-Fi IoT switch, as an acknowledgement of the Wi-Fi IoT device having received the unicast packet or broadcast packet carrying the control command field;

or, the Wi-Fi IoT device feeds back an ACK packet automatically replied by its MAC hardware based on Wi-Fi standards to the Wi-Fi IoT switch, as an acknowledgement of the Wi-Fi IoT device having received the unicast packet or broadcast packet carrying the control command field;

or, the Wi-Fi IoT device sends no feedback or acknowledgement to the sending Wi-Fi IoT switch for the received unicast packet or broadcast packet carrying control command field.

Preferably, the Wi-Fi IoT device is a device that is already communicatively connected with a Wi-Fi access point through a standard Wi-Fi STA mode, and is capable of accessing internet through the Wi-Fi access point;

or, the Wi-Fi IoT device is a device that supports both standard Wi-Fi STA mode and SoftAP mode is already communicatively connected with a Wi-Fi access point through a standard Wi-Fi STA mode, and is capable of accessing internet through the Wi-Fi access point.

As compared with conventional technologies, the present invention provides an IoT control switch based on fingerprint identification permission control and method, which is advantageous in that:

through local acquisition and local identification of user fingerprint information, comparing with fingerprint features in a fingerprint database and scope of permissions, and controlling the transmission of control signals with different permissions between a wire-free fingerprint Wi-Fi IoT switch and one or more standard Wi-Fi IoT devices, the present invention realizes connectionless low power consumption communication control process in MAC layer.

With respect to various fingerprint control security requirements of the wire-free fingerprint Wi-Fi IoT switch, the present invention may define different types of control IEs, so as to realize different levels of control for one or more Wi-Fi IoT devices, ranging from simple control to fine and complicated control.

With the advance of semiconductor technologies and pattern recognition technologies, local real-time fingerprint acquisition and fingerprint identification algorithms may be realized with low complexity and low power consumption, thereby ensuring the battery replacement or charging cycle for battery-powered application devices to be with acceptable ranges.

Moreover, in order to control Wi-Fi IoT devices with higher requirements for security level, and/or save power for wire-free fingerprint Wi-Fi IoT switches, it may be provided that a cloud server implements more advanced fingerprint identification algorithms to perform secondary authentication control, such that a standard Wi-Fi IoT device may, according to identification verification result from the server for fingerprint information acquired by the wire-free fingerprint Wi-Fi IoT switch, determine whether to execute the control command sent by the wire-free fingerprint Wi-Fi IoT switch.

For a wire-free fingerprint Wi-Fi switch aimed to be not bounded by wires and mainly battery-powered, if a control mode based on conventional Wi-Fi links is used, battery life may be significantly reduced. In order to overcome this disadvantage of the conventional control mode, the wire-free fingerprint Wi-Fi IoT switch of the present invention utilizes a unicast packet or broadcast packet to transmit a control command field in MAC layer connectionless mode, such that the wire-free fingerprint Wi-Fi IoT switch may send least number of packets via radio frequency to complete the transmission of control information, achieve minimum power consumption, and lengthen the replacement or charging cycle of battery to a maximum extent.

Meanwhile, since continuous power supply is available, a standard Wi-Fi IoT device may also, at the same time when listening to the control command of wire-free fingerprint Wi-Fi IoT switch, connect to an AP in a normal STA mode, access internet, and reserve the functions of mobile phone application control and remote control.

To realize the connectionless communication mechanism of the present invention at a standard Wi-Fi IoT device, it only requires a few modifications to the software portion for MAC layer, or even may be realized in application layer, such that the invention may be realized in existing Wi-Fi chips, with considerably low cost and easy implementation method.

The wire-free fingerprint Wi-Fi IoT switch may, in a MAC connectionless communication control mode, support MAC connectionless communication control protocol stack structures, and support the desired fingerprint security control mode; if software update or fingerprint feature information list update is needed, it may control the wire-free fingerprint Wi-Fi IoT switch via an upgrade button to connected to the internet server through an AP, and at this point, internet access may be realized through normal IoT device protocol stack structures to complete the update or upgrade of firmware, the fingerprint feature information list, etc.

The application scenarios of the present invention include but not limited to semi-open or open scenarios, control and management of different permissions for multiple persons multiple device (group). For example, in a property management system for a building or estate, security personnel, cleaning personnel, service and management personnel may have switch control requirements with different permissions for different IoT devices; or permission control requirements for outdoor patio IoT devices may be restricted to family members. The present invention may be accommodated in different application spaces, eliminate most wirings for switches, combine multiple switches that are less frequently used, and may further provide flexible arrangement and change of switch locations according to needs.

DETAILED DESCRIPTION OF THE PREFERRED EMBODIMENTS

Figure 1:
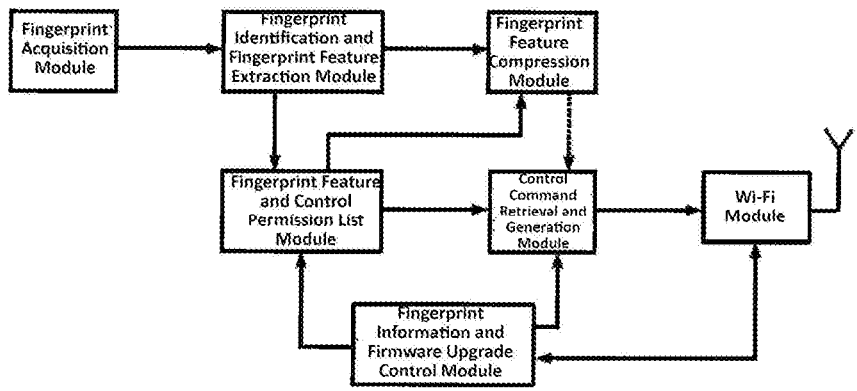
FIG. 1 is an illustrative structural diagram of a wire-free fingerprint Wi-Fi IoT switch according to the present invention.

As shown in FIG. 1, a wire-free fingerprint Wi-Fi IoT switch of the present invention comprises: a fingerprint acquisition module, a fingerprint identification and fingerprint feature extraction module, a fingerprint feature and control permission list module, a fingerprint feature compression module, a control command retrieval and generation module, a fingerprint information and firmware upgrade control module, and a Wi-Fi module.

The wire-free fingerprint Wi-Fi IoT switch may be a stationary device or a portable mobile device: for example, it may be assembled on a controlled Wi-Fi IoT device, or fixedly installed near the controlled Wi-Fi IoT device, or may be moved to near the controlled Wi-Fi IoT device, thereby eliminating wirings between the device, a power supply, and the switch, but the actual arrangement of the invention is not limited as such. A smart mobile terminal may remotely control the Wi-Fi IoT device via a standard Wi-Fi link, independent of the control of the wire-free IoT switch.

At an initial stage of configuring the whole IoT device control system, firstly, acquisition of fingerprint feature information, and permission and security level configuration pairing between fingerprint information and the Wi-Fi IoT device are performed. A user may acquire the fingerprint feature information of the target user (group) through the smart terminal, and perform pairing between the acquired single fingerprint or multiple fingerprints and one or more Wi-Fi IoT devices on the smart terminal, and set a control security level and a corresponding fingerprint control mode for the device (group).

A MAC address of the Wi-Fi IoT device and an encryption key for the control command are set. At the same time, the MAC address of the wire-free fingerprint Wi-Fi IoT switch is paired with the corresponding Wi-Fi IoT device (group).

Then, the smart terminal may upload an information list including the fingerprint feature information, the MAC address group, the control command type, the encryption key information, the fingerprint control mode, etc. to the server. The user controls the Wi-Fi module of the wire-free fingerprint Wi-Fi IoT switch via an upgrade button of the fingerprint information and firmware upgrade control module to connect to a nearby AP in STA mode; update of information, e.g., fingerprint information and control permission list, is performed on the server; and the updated information is stored in the fingerprint feature and control permission list module.

At this point, pairing between the wire-free fingerprint Wi-Fi IoT switch and the Wi-Fi IoT device is completed, and subsequently it may enter into the low power consumption fingerprint control mode.

When the fingerprint acquisition module of the wire-free fingerprint Wi-Fi IoT switch has acquired possible fingerprint information, the fingerprint identification and fingerprint feature extraction module cooperates with the fingerprint feature and control permission list module to identify the fingerprint information in real time, and determine a security control mode for the fingerprint information.

When the wire-free fingerprint Wi-Fi IoT switch completes all the local fingerprint identification tasks in the fingerprint security control mode, a corresponding control command field may be generated through the control command retrieval and generation module, according to the current fingerprint security control mode, in or without combination with compressed fingerprint feature information generated by the fingerprint feature compression module.

Then, the Wi-Fi module of the wire-free fingerprint Wi-Fi IoT switch does not transmit control command based on a connection in the MAC layer, but transmits control command in various possible non-crypted or crypted unicast/broadcast packets, in the privately defined control information element (IE, Information Element), so as to transmit the control command field generated in the previous step to a corresponding controlled standard Wi-Fi IoT device.

The privately defined control information element is also called as private information element, or private IE. According to the provisions of the Wi-Fi standard protocol, a manufacturer and vendor may, depending on application requirements, define private IEs in MAC layer, so as to fulfill private communication requirements. In the present invention, different types of control IEs may be defined with respect to different fingerprint control security requirements of the wire-free fingerprint Wi-Fi IoT switch, so as to realize different levels of control for one or more Wi-Fi IoT devices, ranging from simple control to fine and complicated control.

In the MAC connectionless communication control mechanism, the wire-free fingerprint Wi-Fi switch uses the privately defined IoT device control IE to transmit control information. Wi-Fi unicast/broadcast packet capable of carrying the privately defined IoT device control IE may include, but not limited to, unicast/broadcast Beacon packet, ProbResp packet, ProbReq packet, Action packet, etc., which are of the packet type that requires no MAC connection and may carry the privately defined IE. With regard to broadcast packet, the pairing information may be saved in the privately defined IoT device control IE; with regard to unicast packet, paired devices may be distinguished in addresses in the packet header, or the pairing information may be saved in the privately defined IoT device control IE.

According to different types of packets used to carry the IoT device control IE and requirements by the application scenario, the Wi-Fi IoT device may acknowledge receipt of packet in the following three manners: 1) application layer or MAC layer software may define an acknowledgement IE to be carried in the above described type of Wi-Fi unicast/broadcast packet, which is used for high level acknowledgement of control information received by the Wi-Fi device. A packet carrying the acknowledgement IE may include, but not limited to, ProbResp packet, Action packet, etc., which are of the packet type that requires no MAC connection and may carry the privately defined IE; 2) no high level acknowledgement is needed, as for certain types of packets, ACK packet automatically replied by MAC hardware according to provisions of the Wi-Fi standard is sufficient; or 3) for certain types of packets, no any acknowledgement is needed, as the Wi-Fi standard prescribes that no ACK packet automatically replied by the MAC hardware is required.

The control information may be encrypted in the following three forms: 1) application layer encryption, which encrypts the IoT device control IE with a paired key; 2) MAC layer encryption, which encrypts packets in MAC layer with a hardware key set at the time of pairing; or 3) no encryption, which sends information in wireless channels as plain text.

According to control security level requirements of different devices, the fingerprint control of the present invention may have the following different modes:

1) single fingerprint simple control mode: for a single fingerprint of a single person, the wire-free fingerprint Wi-Fi IoT switch performs local acquisition of fingerprint, and after successful identification, the wire-free fingerprint Wi-Fi IoT switch may immediately send a switching command to the corresponding Wi-Fi IoT device, without requiring other identity verification steps.

This mode provides fastest switching operation and highest efficiency, but lowest security level.

2) multiple fingerprints of a single person/multiple fingerprints of multiple persons control mode: the wire-free fingerprint Wi-Fi IoT switch need to locally acquired information of a certain number of fingerprints in certain order (fingerprint information is independent from each other, and may be from fingerprints of a single person or multiple persons), and after successful identification locally, the wire-free fingerprint Wi-Fi IoT switch may send a switching command to the corresponding Wi-Fi IoT device.

This mode performs fingerprint identification locally with relatively high efficiency and relatively high security level.

3) single fingerprint/multiple fingerprints secondary authentication control mode: in the fingerprint identification and fingerprint feature extraction module of the wire-free fingerprint Wi-Fi IoT switch, the applied fingerprint identification algorithm is relatively simple. When controlling a wireless IoT device with higher requirements for security level, more reliable fingerprint identification algorithm (e.g., distinguishing biometric characteristics and fingerprint mold, etc.) may be needed. Since the power supply of wire-free fingerprint Wi-Fi IoT switch is restricted, more advanced fingerprint identification algorithms may be implemented on the cloud server.

To this end, local to the wire-free fingerprint Wi-Fi IoT switch, the fingerprint identification module acquires control fingerprint information of the security level, and after successful identification, one or more extracted fingerprint feature information may be subject to fingerprint feature compression (e.g., fingerprint compression algorithms such as matrix optimization, sparse representation) so as to reduce the amount of data to be transmitted, and carry the compressed fingerprint feature information in the control command, so as to be transmitted to the controlled standard Wi-Fi IoT device through the MAC layer connectionless communication mechanism.

After an active standard Wi-Fi IoT device has received the control information packet, it sends the compressed fingerprint feature information to the cloud server through an AP via a normal Wi-Fi link, a more reliable fingerprint identification algorithm is utilized on the cloud server to perform secondary authentication on the fingerprint information group acquired by the wire-free fingerprint Wi-Fi IoT switch. The cloud server returns a result of the secondary authentication to the standard Wi-Fi IoT device, and the standard Wi-Fi IoT device in turn, according to the result of identification verification from the server for the fingerprint information acquired by the wire-free fingerprint Wi-Fi IoT switch, determines whether to execute the control command sent by the wire-free fingerprint Wi-Fi IoT switch.

In this mode, the switch control speed mainly depends on the time for transmitting the secondary fingerprint information transmission between the standard Wi-Fi IoT device and the cloud server and the time for identification verification, which is relatively low in efficiency, but provides the highest security level.

The above described packet type, manner of acknowledgement, manner of encryption, and different fingerprint security control modes may be freely combined with each other according to the particular circumstances.

Figure 2:
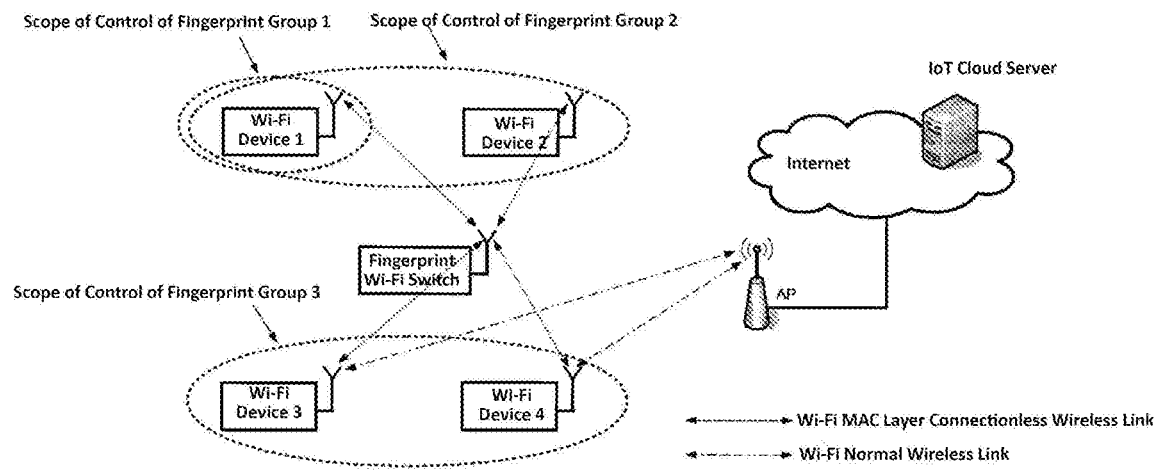
FIG. 2 an illustrative structural diagram an IoT device control system according an embodiment of the present invention.

An application scenario as shown in FIG. 2 will be taken as an example in the following to describe a particular embodiment of the present invention. The present embodiment comprises one wire-free fingerprint Wi-Fi IoT switch, and four IoT Wi-Fi devices. Three groups of fingerprint information with different permissions were recorded into the wire-free fingerprint Wi-Fi IoT switch: a fingerprint group 1 controls an IoT Wi-Fi device 1, which uses the single fingerprint simple control mode; a fingerprint group 2 controls the IoT Wi-Fi device groups 1 and 2, which uses the multiple fingerprints of a single person/multiple fingerprints of multiple persons control mode; and a fingerprint group 3 controls the IoT Wi-Fi device group 3 and 4, which uses the single fingerprint/multiple fingerprints secondary authentication control mode. The three different device groups may utilize different MAC layer connectionless communication control mechanisms, and have different security encryption levels and different fingerprint security control levels.

a) for the Wi-Fi IoT device 1, if it only supports the standard Wi-Fi STA mode, and is already connected to the AP, then in this mode, when the fingerprint acquisition module and the fingerprint identification module detect the single fingerprint 1, the wire-free fingerprint Wi-Fi switch may carry the control command to be sent by the Wi-Fi module in a broadcast Beacon packet for MAC layer connectionless communication.

The wire-free fingerprint Wi-Fi switch sends a plurality of (e.g., 10) broadcast Beacon packets carrying the control IE to the Wi-Fi IoT device 1 within a time window (e.g., 100 milliseconds), and the Wi-Fi IoT device 1 does need to reply with acknowledgement, and the MAC hardware will not send an ACK packet acknowledgement for the broadcast Beacon packet.

In this circumstance, the control information in the Beacon received by the Wi-Fi IoT device 1 may be passed to the application layer, and this control process only requires modification of application layer code for implementation, without needing to modify MAC and lower level software, which is most easy to implement.

b) for the Wi-Fi IoT devices 1 and 2, if all the devices in the device group only support the standard Wi-Fi STA mode, and are already connected to the AP, then in this mode, after the fingerprint acquisition module and the fingerprint identification module detect the information of the first fingerprint from the fingerprint group 2, the wire-free fingerprint Wi-Fi switch waits for the subsequent fingerprint information to be acquired and recorded. Only when the information of all the fingerprints from the fingerprint group is all acquired in a certain order (or without order) and is successfully identified, the Wi-Fi module of the wire-free fingerprint Wi-Fi IoT switch may carry the control command to be sent in the broadcast ProbResp packet for MAC layer connectionless communication.

The wire-free fingerprint Wi-Fi switch sends a unicast ProbResp packet carrying the IoT device control IE as above described to the Wi-Fi IoT devices 1 and 2, respectively, and waits for the Wi-Fi IoT devices 1 and 2 to return a MAC hardware ACK packet, respectively. If a timeout is determined, then the packet will be retransmitted, until a corresponding ACK packet is successfully received, or interrupted by other actions of the user.

In this mode, the Wi-Fi IoT devices 1 and 2 require modifications of MAC layer software and application layer software code.

c) for the Wi-Fi IoT devices 3 and 4, if this group of devices may support both the standard Wi-Fi STA mode and the SoftAP mode, and are already connected to the AP in the standard Wi-Fi STA mode. Utilizing the SoftAP mode of the device group, the wire-free fingerprint Wi-Fi switch may also send a broadcast/unicast ProbReq or broadcast/unicast Action packet, which carries the IoT device control IE.

When the fingerprint acquisition module and the fingerprint identification module detect the information of the first fingerprint from the fingerprint group 3, the wire-free fingerprint Wi-Fi switch waits for the subsequent fingerprint information to be acquired and recorded. Only after the information of all the fingerprints from the fingerprint group 3 are locally acquired in a certain order (or without order) and successfully identified, the wire-free fingerprint Wi-Fi switch may compress the fingerprint feature acquired in this batch, and adds the compressed fingerprint feature, together with the control command field, in the broadcast/unicast ProbReq or broadcast/unicast Action packet, so as to be sent to the Wi-Fi IoT device groups 3 and 4.

The below two modes are both feasible:

The wire-free fingerprint Wi-Fi switch sends a plurality of (e.g., 10) broadcast ProbReq/Action packets carrying the IoT device control IE to the Wi-Fi IoT devices 3 and 4 within a time window (e.g., 100 milliseconds).

After the Wi-Fi IoT devices 3 and 4 have received the above described broadcast ProbReq/Action packet, they may proceed in the manner that they do not reply with an acknowledgement packet, where the MAC hardware may not reply with an ACK packet; they may also proceed in the manner that they reply with a corresponding ProbResp/ Action packet carrying the acknowledgement IE.

Alternatively, after the Wi-Fi IoT devices 3 and 4 have received the above described unicast ProbReq/Action packet, according to the standard Wi-Fi behavior, the MAC layer hardware will reply an ACK packet respectively; in addition, further acknowledgement may be performed by corresponding ProbResp/Action packets carrying the acknowledgement IE.

Subsequently, according to the previous settings of the IoT device control system, one (or each one) of Wi-Fi IoT devices 3 and 4 sends the compressed fingerprint feature information acquired by the wire-free fingerprint Wi-Fi switch via the access point AP to the IoT cloud server. After decompressing the fingerprint feature information, the server utilizes one or a plurality of other more reliable fingerprint identification algorithms to perform secondary identification verification. Subsequently, the IoT cloud server sends a result of the secondary fingerprint identification verification back to the Wi-Fi IoT devices 3 and 4 through the network link. According to the received server verification result, the Wi-Fi IoT devices 3 and 4 decide whether to perform the control command sent by the wire-free fingerprint Wi-Fi switch.

In summary, the wire-free fingerprint Wi-Fi IoT switch of the present invention may: 1) support standard Wi-F functions, and may, by using a control button, connect to an AP in a normal manner, and connect to the external network via the AP; 2) acquire fingerprint and perform local real-time fingerprint identification; 3) support preset control procedures in the manner of unicast packet or broadcast packet control; and 4) support different preset fingerprint security control mode.

A Wi-Fi IoT device corresponding thereto shall be able to: 1) support an agreed manner for cooperating with a smart terminal to complete the configuration of pairing information; 2) support preset control procedures in the manner of unicast packet or broadcast packet control; 3) and if necessary, support the single fingerprint/multiple fingerprints secondary authentication control mode. The Wi-Fi IoT device may both support the standard Wi-Fi functions, and be able to connect to an AP in a normal manner, and connect to the external network via the AP.

Although the content of the present invention is described in detail through the above described preferred embodiments, it shall be understood that the above description should not be considered as limiting the present invention. After reviewing the above content, various modification and substitution to the present invention will become apparent to a person skilled in the art. Thus, the scope of protection of the present invention shall be defined by the appended claims.

The invention claimed is:

1. An IoT control switch based on fingerprint identification permission control, wherein a Wi-Fi IoT switch comprises:
   a fingerprint acquisition module, which acquires fingerprint information;
   a fingerprint identification and fingerprint feature extraction module, which is communicatively connected with the fingerprint acquisition module, and obtains the acquired fingerprint information to perform identification and extraction of fingerprint feature;
   a fingerprint feature and control permission list module, which stores a fingerprint feature and control permission list matching with identifiable fingerprint information, and is communicatively connected with the fingerprint identification and fingerprint feature extraction module to obtain the extracted fingerprint feature, so as to identify and determine a control permission and a fingerprint control mode corresponding thereto;

a fingerprint feature compression module, which is communicatively connected with the fingerprint identification and fingerprint feature extraction module and/or the fingerprint feature and control permission list module to obtain and compress the extracted fingerprint feature, so as to produce compressed fingerprint feature information;

a control command retrieval and generation module, which is communicatively connected with the fingerprint feature and control permission list module to obtain the determined control permission and fingerprint control mode, and generate a corresponding control command field; or, the control command retrieval and generation module is communicatively connected with the fingerprint feature compression module and the fingerprint feature and control permission list module to obtain the compressed fingerprint feature information and the determined control permission and fingerprint control mode, and generate a corresponding control command field; and a Wi-Fi module, which is communicatively connected with the control command retrieval and generation module to obtain the generated control command field, carry the control command field by a privately defined control information element in a unicast packet or broadcast packet without requiring a MAC layer connection, and send the unicast packet or broadcast packet to one or more Wi-Fi IoT devices, so as to control a Wi-Fi IoT device or device group matching with the control permission.

2. The IoT control switch according to claim 1, wherein the Wi-Fi IoT switch further comprises a fingerprint information and firmware upgrade control module, which is communicatively connected with an IoT cloud server through a Wi-Fi module connected to a Wi-Fi access point in an STA mode, performs firmware upgrade to the Wi-Fi IoT switch, and/or obtains the identifiable fingerprint information and the fingerprint feature and control permission list matching therewith recorded by the IoT cloud server, and sends the obtained information and list to the fingerprint feature and control permission list module for information update.

3. The IoT control switch according to claim 1, wherein the broadcast packet contains pairing information in the privately defined control information element;

the unicast packet distinguishes paired devices through addressed in packet headers, or contains pairing information in the privately defined control information element;

the pairing information, cooperatively provided by the Wi-Fi IoT device and an external smart terminal, comprises pairing information between fingerprint feature of a user or user group acquired by the smart terminal and a Wi-Fi IoT device or device group controllable within the permission of the user or user group; and the pairing information further comprises one or more of:

information for setting a control security level and a corresponding fingerprint control mode for the controllable Wi-Fi IoT device or device group by the smart terminal;

information for pairing a MAC address of the Wi-Fi IoT switch and the controllable Wi-Fi IoT device or device group;

a MAC address of the controllable Wi-Fi IoT device or device group; and information for setting an encryption key for a control command corresponding to the control command field.

4. The IoT control switch according to claim 1, wherein the Wi-Fi IoT switch conforms to one or more of S1, S2, and S3:

S1) the unicast packet or broadcast packet is a Beacon packet, or a ProbResp packet, or a ProbReq packet, or an Action packet;

S2) the control command corresponding to the control command field is provided with a key for application layer encryption, or provided a key for MAC layer encryption, or no encryption; and S3) the fingerprint control mode comprises:

a first fingerprint control mode, wherein the Wi-Fi IoT switch, based on a result of local acquisition and identification of a single fingerprint of a single person, sends a unicast packet or broadcast packet carrying the control command field to the corresponding Wi-Fi IoT device or device group;

or, a second fingerprint control mode, wherein the Wi-Fi IoT switch, based on a result of local acquisition and identification of multiple fingerprints of a single person or multiple fingerprints of multiple persons, sends a unicast packet or broadcast packet carrying the control command field to the corresponding Wi-Fi IoT device or device group; the multiple fingerprints of a single person or the multiple fingerprints of multiple persons are acquired in a specified order, or acquired without order;

or, a third fingerprint control mode, wherein the Wi-Fi IoT switch, based on a result of local acquisition and identification of multiple fingerprints of a single person or multiple fingerprints of multiple persons, sends a unicast packet or broadcast packet carrying the control command field to corresponding Wi-Fi IoT device or device group; at least one Wi-Fi IoT device that receives the unicast packet or broadcast packet, sends the compressed fingerprint feature information contained in the control command field to the IoT cloud server through a Wi-Fi access point; the IoT cloud server performs a secondary fingerprint identification verification on the compressed fingerprint feature information after decompression, and feeds back the result of secondary verification to all Wi-Fi IoT devices that have received the unicast packet or broadcast packet; the Wi-Fi IoT devices that have received the unicast packet or broadcast packet, according to the result of secondary verification, determine whether to execute the control command corresponding to the control command field.

5. The IoT control switch according to claim 2, wherein the Wi-Fi IoT switch conforms to one or more of S1, S2, and S3:

S1) the unicast packet or broadcast packet is a Beacon packet, or a ProbResp packet, or a ProbReq packet, or an Action packet;

S2) the control command corresponding to the control command field is provided with a key for application layer encryption, or provided a key for MAC layer encryption, or no encryption; and S3) the fingerprint control mode comprises:

a first fingerprint control mode, wherein the Wi-Fi IoT switch, based on a result of local acquisition and identification of a single fingerprint of a single person, sends a unicast packet or broadcast packet carrying the control command field to the corresponding Wi-Fi IoT device or device group;

or, a second fingerprint control mode, wherein the Wi-Fi IoT switch, based on a result of local acquisition and identification of multiple fingerprints of a single person or multiple fingerprints of multiple persons, sends a unicast packet or broadcast packet carrying the control command field to the corresponding Wi-Fi IoT device or device group; the multiple fingerprints of a single person or the multiple fingerprints of multiple persons are acquired in a specified order, or acquired without order;

or, a third fingerprint control mode, wherein the Wi-Fi IoT switch, based on a result of local acquisition and identification of multiple fingerprints of a single person or multiple fingerprints of multiple persons, sends a unicast packet or broadcast packet carrying the control command field to corresponding Wi-Fi IoT device or device group; at least one Wi-Fi IoT device that receives the unicast packet or broadcast packet, sends the compressed fingerprint feature information contained in the control command field to the IoT cloud server through a Wi-Fi access point; the IoT cloud server performs a secondary fingerprint identification verification on the compressed fingerprint feature information after decompression, and feeds back the result of secondary verification to all Wi-Fi IoT devices that have received the unicast packet or broadcast packet; the Wi-Fi IoT devices that have received the unicast packet or broadcast packet, according to the result of secondary verification, determine whether to execute the control command corresponding to the control command field.

6. The IoT control switch according to claim 3, wherein the Wi-Fi IoT switch conforms to one or more of S1, S2, and S3:

S1) the unicast packet or broadcast packet is a Beacon packet, or a ProbResp packet, or a ProbReq packet, or an Action packet;

S2) the control command corresponding to the control command field is provided with a key for application layer encryption, or provided a key for MAC layer encryption, or no encryption; and S3) the fingerprint control mode comprises:

a first fingerprint control mode, wherein the Wi-Fi IoT switch, based on a result of local acquisition and identification of a single fingerprint of a single person, sends a unicast packet or broadcast packet carrying the control command field to the corresponding Wi-Fi IoT device or device group;

or, a second fingerprint control mode, wherein the Wi-Fi IoT switch, based on a result of local acquisition and identification of multiple fingerprints of a single person or multiple fingerprints of multiple persons, sends a unicast packet or broadcast packet carrying the control command field to the corresponding Wi-Fi IoT device or device group; the multiple fingerprints of a single person or the multiple fingerprints of multiple persons are acquired in a specified order, or acquired without order;

or, a third fingerprint control mode, wherein the Wi-Fi IoT switch, based on a result of local acquisition and identification of multiple fingerprints of a single person or multiple fingerprints of multiple persons, sends a unicast packet or broadcast packet carrying the control command field to corresponding Wi-Fi IoT device or device group; at least one Wi-Fi IoT device that receives the unicast packet or broadcast packet, sends the compressed fingerprint feature information contained in the control command field to the IoT cloud server through a Wi-Fi access point; the IoT cloud server performs a secondary fingerprint identification verification on the compressed fingerprint feature information after decompression, and feeds back the result of secondary verification to all Wi-Fi IoT devices that have received the unicast packet or broadcast packet; the Wi-Fi IoT devices that have received the unicast packet or broadcast packet, according to the result of secondary verification, determine whether to execute the control command corresponding to the control command field.

7. An IoT control method based on fingerprint identification permission control, wherein performing, through a Wi-Fi IoT switch, the following fingerprint control operations of:

acquiring fingerprint information, and extracting corresponding fingerprint feature;

based on a stored fingerprint feature and control permission list matching with identifiable fingerprint information, performing identification of the extracted fingerprint feature and determining the control permission and the fingerprint control mode corresponding thereto;

generating a control command field corresponding to the control command, the control permission and the fingerprint control mode; or, generating a control command field corresponding to compressed fingerprint feature information, the control command, the control permission and the fingerprint control mode; the compressed fingerprint feature information is produced by compressing the extracted fingerprint feature compress; and using a configured Wi-Fi module to carry the control command field by a privately defined control information element in a unicast packet or broadcast packet without requiring a MAC layer connection, and send the unicast packet or broadcast packet to one or more Wi-Fi IoT devices, and control a Wi-Fi IoT device or device group matching with the control permission.

8. The IoT control method according to claim 7, wherein according to the determined first fingerprint control mode, the Wi-Fi IoT switch, based on a result of local acquisition and identification of a single fingerprint of a single person, sends a unicast packet or broadcast packet carrying the control command field to a corresponding Wi-Fi IoT device or device group;

or, according to the determined second fingerprint control mode, the Wi-Fi IoT switch, based on a result of local acquisition and identification of multiple fingerprints of a single person or multiple fingerprints of multiple persons, sends a unicast packet or broadcast packet carrying the control command field to the corresponding Wi-Fi IoT device or device group; the multiple fingerprints of a single person or multiple fingerprints of multiple persons are acquired in a specified order, or acquired without order;

or, according to the determined third fingerprint control mode, the Wi-Fi IoT switch, based on a result of local acquisition and identification of multiple fingerprints of a single person or multiple fingerprints of multiple persons, sends a unicast packet or broadcast packet carrying the control command field to corresponding Wi-Fi IoT device or device group;

at least one Wi-Fi IoT device that receives the unicast packet or broadcast packet, sends the compressed fingerprint feature information contained in the control command field to the IoT cloud server through a Wi-Fi access point;

the IoT cloud server performs a secondary fingerprint identification verification on the compressed fingerprint feature information after decompression, and feeds back the result of secondary verification to all Wi-Fi IoT devices that have received the unicast packet or broadcast packet; and the Wi-Fi IoT devices that have received the unicast packet or broadcast packet, according to the result of secondary verification, determine whether to execute the control command corresponding to the control command field.

9. The IoT control method according to claim 7, wherein before the Wi-Fi IoT switch performs the fingerprint control operation, the method further comprises the following system configuration operations performed by a smart terminal:

the smart terminal pairing the acquired fingerprint feature of the user or user group and the Wi-Fi IoT device or device group controllable within the permission of the user or user group;

setting a control security level and a corresponding fingerprint control mode to be implemented for the controllable Wi-Fi IoT device or device group;

setting a MAC address for the controllable Wi-Fi IoT device or device group, and an encryption key for the control command;

pairing the MAC address of the Wi-Fi IoT switch with the controllable Wi-Fi IoT device or device group;

uploading an information list containing the fingerprint feature, the MAC address group, the control command type, the encryption key information, and the fingerprint control mode to the IoT cloud server; and connecting the Wi-Fi module of the Wi-Fi IoT switch to a nearby Wi-Fi access point through a standard Wi-Fi STA mode, obtaining the fingerprint feature and control permission list from the IoT cloud server, and storing the obtained fingerprint feature and control permission list to the fingerprint feature and control permission list module for information update.

10. The IoT control method according to claim 8, wherein the Wi-Fi IoT switch conforms to S1 and/or S2:

S1) the unicast packet or broadcast packet is a Beacon packet, a ProbResp packet, a ProbReq packet, or an Action packet; and S2) the control command corresponding to the control command field is provided with a key for application layer encryption, or provided a key for MAC layer encryption, or no encryption.

11. The IoT control method according to claim 7, wherein the Wi-Fi IoT device carries an acknowledgement information element defined in the application layer or MAC layer in a unicast packet or broadcast packet fed back to the Wi-Fi IoT switch, as an acknowledgement of the Wi-Fi IoT device having received the unicast packet or broadcast packet carrying the control command field;

or, the Wi-Fi IoT device feeds back an ACK packet automatically replied by its MAC hardware based on Wi-Fi standards to the Wi-Fi IoT switch, as an acknowledgement of the Wi-Fi IoT device having received the unicast packet or broadcast packet carrying the control command field;

or, the Wi-Fi IoT device sends no feedback or acknowledgement to the sending Wi-Fi IoT switch for the received unicast packet or broadcast packet carrying control command field.

12. The IoT control method according to claim 7, wherein the Wi-Fi IoT device is a device that is already communicatively connected with a Wi-Fi access point through a standard Wi-Fi STA mode, and is capable of accessing internet through the Wi-Fi access point;

or, the Wi-Fi IoT device is a device that supports both standard Wi-Fi STA mode and SoftAP mode is already communicatively connected with a Wi-Fi access point through a standard Wi-Fi STA mode, and is capable of accessing internet through the Wi-Fi access point.

13. The IoT control method according to claim 8, wherein the Wi-Fi IoT device carries an acknowledgement information element defined in the application layer or MAC layer in a unicast packet or broadcast packet fed back to the Wi-Fi IoT switch, as an acknowledgement of the Wi-Fi IoT device having received the unicast packet or broadcast packet carrying the control command field;

or, the Wi-Fi IoT device feeds back an ACK packet automatically replied by its MAC hardware based on Wi-Fi standards to the Wi-Fi IoT switch, as an acknowledgement of the Wi-Fi IoT device having received the unicast packet or broadcast packet carrying the control command field;

or, the Wi-Fi IoT device sends no feedback or acknowledgement to the sending Wi-Fi IoT switch for the received unicast packet or broadcast packet carrying control command field.

14. The IoT control method according to claim 10, wherein the Wi-Fi IoT device carries an acknowledgement information element defined in the application layer or MAC layer in a unicast packet or broadcast packet fed back to the Wi-Fi IoT switch, as an acknowledgement of the Wi-Fi IoT device having received the unicast packet or broadcast packet carrying the control command field;

or, the Wi-Fi IoT device feeds back an ACK packet automatically replied by its MAC hardware based on Wi-Fi standards to the Wi-Fi IoT switch, as an acknowledgement of the Wi-Fi IoT device having received the unicast packet or broadcast packet carrying the control command field;

or, the Wi-Fi IoT device sends no feedback or acknowledgement to the sending Wi-Fi IoT switch for the received unicast packet or broadcast packet carrying control command field.

15. The IoT control method according to claim 8, wherein the Wi-Fi IoT device is a device that is already communicatively connected with a Wi-Fi access point through a standard Wi-Fi STA mode, and is capable of accessing internet through the Wi-Fi access point;

or, the Wi-Fi IoT device is a device that supports both standard Wi-Fi STA mode and SoftAP mode is already communicatively connected with a Wi-Fi access point through a standard Wi-Fi STA mode, and is capable of accessing internet through the Wi-Fi access point.

* * * * *